(12) United States Patent
Demott et al.

(10) Patent No.: US 6,774,067 B2
(45) Date of Patent: Aug. 10, 2004

(54) MAT AND METHOD OF MANUFACTURING A MAT

(75) Inventors: Roy P. Demott, Spartanburg, SC (US); Kimberly C. Gillis, Moore, SC (US); Ernest G. Stringer, Spartanburg, SC (US); Terence M. Hedley, Leighton Buzzard (GB)

(73) Assignee: Milliken & Company, Spartanburg, SC (US)

( * ) Notice: Subject to any disclaimer, the term of this patent is extended or adjusted under 35 U.S.C. 154(b) by 148 days.

(21) Appl. No.: 09/809,664

(22) Filed: Mar. 15, 2001

(65) Prior Publication Data

US 2001/0044249 A1 Nov. 22, 2001

Related U.S. Application Data

(63) Continuation-in-part of application No. 09/527,629, filed on Mar. 17, 2000.

(30) Foreign Application Priority Data

Mar. 17, 2000 (GB) ............................................. 0006377
Aug. 8, 2000 (GB) ............................................. 0019413

(51) Int. Cl.[7] .......................... B32B 27/04; D04B 21/04
(52) U.S. Cl. ........................ 442/312; 442/86; 442/313; 428/89; 428/92; 428/95; 428/96; 428/159; 428/542.6
(58) Field of Search ............................. 428/88, 89, 92, 428/95, 96, 97, 156, 159, 189, 190, 542.6; 442/312, 313, 86

(56) References Cited

U.S. PATENT DOCUMENTS

| | | | |
|---|---|---|---|
| 3,377,249 A | 4/1968 | Marco | |
| 3,540,835 A | 11/1970 | Marco | ........................ 8/115.6 |
| 3,620,826 A | 11/1971 | Machell | .................... 117/139.5 |

(List continued on next page.)

FOREIGN PATENT DOCUMENTS

| | | |
|---|---|---|
| AU | 199884182 | 3/2000 |
| AU | 200027816 B3 | 6/2000 |
| BE | 700859 A | 12/1967 |
| DE | 4318500 | 12/1994 |
| EP | 0 107 197 | 5/1984 |
| EP | 0 515 206 A1 | 5/1991 |
| EP | 0429802 | 6/1991 |
| EP | 0 429 802 A3 | 7/1992 |
| EP | 0631860 | 6/1994 |
| EP | 1 013 809 A1 | 6/2000 |
| GB | 2 052 385 A | 4/1980 |
| GB | 2 054 369 | 2/1981 |
| GB | 2 210 324 A | 2/1988 |
| GB | 2 229 083 A | 9/1990 |
| JP | 57046846 | 3/1982 |
| JP | 02045016 | 2/1990 |
| JP | 04007174 | 10/1992 |
| JP | 6262730 | 9/1995 |
| JP | 09047347 | 2/1997 |
| JP | 10-85114 | 4/1998 |
| JP | 10211078 | 11/1998 |
| JP | 11206696 A | 8/1999 |
| WO | WO 9632526 | 10/1996 |
| WO | WO 00/15085 | 3/2000 |
| WO | 01/05296 | 1/2001 |
| WO | 01/71079 A2 | 9/2001 |
| ZA | 77/4110 | 7/1977 |

*Primary Examiner*—Cheryl A Juska
*Assistant Examiner*—Jenna-Leigh Befumo
(74) *Attorney, Agent, or Firm*—Terry T. Moyer; Daniel R. Alexander

(57) ABSTRACT

A mat has fabric layer (4) and a rubber backing (6) bonded to the fabric layer. The fabric layer (4) includes a microknitted plush polyester fabric that is chemically treated to render it hydrophilic. The fabric layer (4) may also have a textured surface that includes raised and/or recessed surface formations (14).

36 Claims, 3 Drawing Sheets

U.S. PATENT DOCUMENTS

| | | | | |
|---|---|---|---|---|
| 3,632,420 A | | 1/1972 | Kuhn | 117/138.8 |
| 3,652,212 A | | 3/1972 | Machell | 8/115.5 |
| 4,038,027 A | | 7/1977 | Kearney | 8/120 |
| 4,131,550 A | | 12/1978 | Marco | 252/8.6 |
| 4,168,954 A | | 9/1979 | Marco | 8/18 |
| 4,240,795 A | | 12/1980 | Hendrix | 8/115.6 |
| 4,318,956 A | | 3/1982 | Stevens et al. | 428/265 |
| 4,433,823 A | | 2/1984 | Pearson | 248/346.1 |
| 4,482,593 A | | 11/1984 | Sagel et al. | 428/90 |
| 4,679,859 A | | 7/1987 | Wilson | 300/21 |
| 4,712,281 A | | 12/1987 | Scheller | 28/162 |
| 4,895,753 A | | 1/1990 | Etter | 428/286 |
| 4,978,566 A | | 12/1990 | Scheurer et al. | 428/157 |
| 5,262,092 A | * | 11/1993 | Reeder et al. | 261/35 |
| 5,370,933 A | | 12/1994 | Govindan | 428/272 |
| 5,486,500 A | | 1/1996 | Kaufman | 503/227 |
| 5,524,317 A | * | 6/1996 | Nagahama et al. | 15/217 |
| 5,557,950 A | | 9/1996 | Richards et al. | 66/194 |
| 5,725,951 A | | 3/1998 | Schuette et al. | 428/375 |
| 5,817,391 A | | 10/1998 | Rock et al. | 428/8.6 |
| 5,916,273 A | | 6/1999 | Hepfinger | 66/194 |
| 5,935,484 A | | 8/1999 | Schuette et al. | 252/8.62 |
| 5,938,162 A | | 8/1999 | Honjo | 248/346.11 |
| 5,962,350 A | | 10/1999 | Krotine | 442/370 |
| 5,965,232 A | * | 10/1999 | Vinod | 428/85 |
| 5,968,207 A | | 10/1999 | Li | 8/490 |
| 6,025,284 A | | 2/2000 | Marco et al. | 442/133 |
| 6,036,902 A | | 3/2000 | Wang | 264/132 |
| 6,381,778 B1 | * | 5/2002 | Peterson | 5/497 |

* cited by examiner

MAT AND METHOD OF MANUFACTURING A MAT

CROSS-REFERENCE TO RELATED APPLICATIONS

This application claims priority to and is a continuation-in-part of U.S. patent application Ser. No. 09/527,629, filed on Mar. 17, 2000; of U.K. Patent application No. 0006377.6, filed Mar. 17, 2000; and, of U.K. Patent application No. 0019413.4, filed Aug. 8, 2000, each hereby incorporated by reference.

According to the present invention there is provided a mat and a method of manufacturing a mat. In particular, but not exclusively, the invention relates to a drip mat and a method of manufacturing a drip mat.

A drip mat is an absorbent mat that is placed on a bar counter to absorb drips and spilled drinks. The present invention is not limited to drip mats but also includes other types of mat such as floor mats, in particular printed floor mats carrying advertisements or other promotional matter, and pads, blotters, multi-layer items, articles, assemblies, pieces, textile materials, composites, or the like. For many years, towels have been used on bars to absorb drips and spilled drinks. However, these have the disadvantage that liquid can soak through the towel onto the surface of the bar.

It is known to provide a drip mat having a fabric layer of tufted cut pile polyester and a rubber backing layer that is vulcanised to the back of the fabric layer. The fabric layer absorbs liquid and the rubber backing layer prevents this liquid from running through onto the surface of the bar. An image may be printed onto the fabric layer by transfer printing, allowing the drip mat to carry an advertisement or other matter. The drip mats are washable by immersion and agitation in water or other cleaning fluid, followed by spin extraction and tumble drying.

There are a number of disadvantages associated with these drip mats. The polyester fabric is hydrophobic and does not have good absorbency. Moisture is therefore slow to soak in and the mat remains feeling wet for a long time. The fabric also has a very limited moisture capacity, with the result that liquid tends to run off the sides of the mat, particularly if it is too wet or when it is lifted. Although the fabric can be printed, the quality of the print is generally not very good, owing to movement of the pile during or after printing. The mat is also difficult to wash, particularly if it is contaminated with oily substances, for which the polyester fabric has a natural affinity.

For improved absorbency, we have tried blends of different fibres, for example polyester and cotton. However, such fabrics are dimensionally not very stable and they tend to fray at the edges. This can be overcome by treating the edges, for example by over stitching the edges or by back coating the fabric with rubber latex, but this increases the cost of the manufacturing process.

The known mats are generally made by vulcanising the rubber backing layer to the back of the fabric layer, and then trimming off the edges of the rubber backing layer to leave a visually attractive rubber border around the fabric layer. However, trimming the edges of the rubber backing layer is labourious, and if the border is not of uniform width, the mat looks untidy. Laying up the fabric and backing layers prior to placing them in the heated press is also time consuming and the manufacturing process is therefore slow and expensive.

It is an object of the present invention to provide a mat, pad, blotter, multi-layer item, article, assembly, piece, textile material, composite, or the like and a method of manufacturing a mat that mitigate at least some of these disadvantages.

According to one embodiment of the present invention there is provided a mat having a fabric layer and a rubber backing bonded to the fabric layer, wherein the fabric layer includes a knitted polyester fabric. The knitted fabric resists fraying, making it possible to produce a mat with cut edges and no rubber borders. Manufacturing costs are therefore low. The fabric is also absorbent, it wicks well, is launderable, is colourfast, is durable, provides for high resolution printing, is dimensionally stable and it prints well.

Advantageously, the fabric layer includes a microknitted polyester fabric, preferably a warp-knitted plush polyester fabric. The fabric may be made from a pile yarn and a ground yarn. The pile yarn is preferably a micro-denier yarn of less than or equal to 1.1 denier. The ground yarn is preferably a monofilament of no less than 10 denier, or alternatively it may be a multi-filament yarn. Advantageously, the fabric is substantially as described in U.S. Pat. No. 5,916,273, the content of which is incorporated by reference herein. The microknitted fabric is treated to provide good water holding capacity and wicking ability.

Advantageously, the fabric has weight of from two to twenty ounces per square yard, preferably seven to nine ounces per square yard. It is therefore dense, which prevents rubber from being pressed through the fabric layer during curing.

Advantageously, the fabric has a first face that in the finished mat is the exposed face of the fabric layer, and said first face (the technical back of the fabric) is sanded, brushed, napped, or otherwise treated to break or raise the surface, so as to form a plush or pile. This provides for a good print quality. Preferably, the first face of the fabric is sanded to produce a pile or velour. The first face of the fabric also has the most overlaps, which enhances or facilitates absorption, wicking, density, and the like.

Advantageously, the fabric has a second face that in the finished mat is bonded to the rubber backing. The second face (the technical front of the fabric) is advantageously relatively smooth and has little stretch.

Advantageously, the fabric is chemically treated to render it hydrophilic. For example, the fabric may be treated with an anionic-ethoxylated sulfonated polyester and a high molecular weight ethoxylated polyester. This treatment allows the polyester fabric to absorb water very rapidly and promotes wicking through the fabric, with the result that the surface of the fabric quickly feels dry to the touch. The treatment also helps to prevent staining, improves washing performance and reduces creasing.

Advantageously, the fabric is at least one of hydrophilic, absorbent, wicking, launderable, printable, non-fraying, dimensionally stable, colourfast, and combinations thereof.

Advantageously, the fabric layer has a textured surface that includes raised and/or recessed surface formations. This greatly increases the water holding capacity of the fabric. The surface formations may have a height of 0.1–2.0 mm, preferably 0.2–0.5 mm and an average surface area of 0.2–100 mm$^2$, preferably 1.0–20 mm$^2$, and may be randomly distributed over substantially the whole of the fabric layer. The surface formations may be formed on the face of the rubber backing that is bonded to the fabric layer.

Advantageously, the fabric layer is printed and preferably the mats have printed borders. This simplifies the process of separating the mats.

Advantageously, the fabric layer covers substantially the whole of one face of the rubber backing and the fabric layer has cut edges, such a mat being very simple to manufacture. The rubber backing may have a thickness of 0.5–5 mm, preferably 1–3 mm. The mat may be suitable for use as a drip mat, a table cloth or mat, or a floor mat.

According to a further aspect of the invention there is provided a mat having a fabric layer and a rubber backing bonded to the fabric layer, wherein the fabric layer is chemically treated to render it hydrophilic.

According to a further aspect of the invention there is provided a mat having a fabric layer and a rubber backing bonded to the fabric layer, wherein the fabric layer has a textured surface.

According to a further aspect of the invention, there is provided an assembly or item having an upper fabric layer and a lower liquid impervious or impermeable layer or backing attached, adhered, bonded, stitched, sprayed, coated, welded, glued, tacked, needled, melted, laser cut, and/or the like thereto or thereon.

According to a further aspect of the invention there is provided a mat, pad, blotter, composite, or the like having a fabric layer and a liquid impervious or impermeable baking layer. Advantageously, the fabric layer is treated to be hydrophilic or is formed of hydrophilic fibres.

According to a further aspect of the invention, there is provided a mat, pad, or the like having a fabric layer which is constructed, treated, and backed. According to a further aspect of the invention there is provided a mat, pad, article, composite, assembly, or the like having an upper surface that is absorbent, wicking, hydrophilic, printable, launderable, and/or combinations thereof and a lower surface that is impervious to liquids, durable, dimensionally stable, and/or combinations thereof.

According to a further aspect of the invention there is provided a method of manufacturing a mat or pad having a fabric layer and a rubber backing, wherein an uncured rubber backing sheet is cured and bonded to a sheet of fabric in a heated press to form a rubber-backed sheet, and the rubber-backed sheet is cut up into individual mats. By making several mats in one pressing operation the method is made more efficient. Aligning the fabric and the backing sheet requires only one operation. Because the mats do not have borders there is no trimming operation and reduced wastage.

Advantageously, the fabric layer includes a knitted or tricot polyester fabric, which does not fray and so avoids the need for hemming or sealing the edges of the fabric.

Advantageously, an image is printed onto the fabric layer during the curing and bonding process in the heated press. All the mats can be printed in a single operation, from a single transfer sheet, reducing alignment problems and allowing more efficient printing. Advantageously, the image includes a plurality of printed margins and the rubber-backed sheet is cut up along the printed margins to separate the individual mats, which makes cutting out very simple.

Advantageously, the fabric is chemically treated to render it hydrophilic, preferably before the pressing operation. Advantageously, the fabric is chemically treated with an anionic-ethoxylated sulfonated polyester and a high molecular weight ethoxylated polyester.

Advantageously, the fabric layer is provided with a textured surface which may be formed by pressing the fabric layer against a texture sheet during the curing and bonding process in the heated press.

Advantageously, the fabric layer comprises a warp-knitted fabric of at least three-bar construction, said fabric being comprised of multi-filament synthetic pile yarns on the technical back that are raised or broken to produce a plush surface, and monofilament synthetic ground yarns on the technical face, wherein at least one of said yarns and fabric are hydrophilic. The fabric may, for example, be as described in U.S. patent application Ser. No. 09/527,629, filed Mar. 17, 2000, the contents of which are incorporated by reference herein.

According to a further aspect of the invention there is provided a method of manufacturing a mat having a fabric layer and a rubber backing, wherein an uncured rubber backing sheet is cured and bonded to a sheet of fabric in a heated press to form a rubber-backed sheet, the fabric being chemically treated to render it hydrophilic.

According to a further aspect of the invention there is provided a method of manufacturing a mat having a fabric layer and a rubber backing, wherein an uncured rubber backing sheet is cured and bonded to a sheet of fabric in a heated press to form a rubber-backed sheet, and the fabric is provided with a textured surface.

According to a further aspect of the invention there is provided a method of manufacturing a mat or pad having a fabric layer and a rubber backing, wherein an uncured rubber backing sheet is cured and bonded to a sheet of fabric in a heated press to form a rubber-backed sheet, said sheet of fabric including a warp-knitted plush polyester fabric.

According to a further aspect of the invention there is provided a method of manufacturing a mat having a fabric layer and a rubber backing, wherein the fabric is at least one of hydrophilic, absorbent, wicking, launderable, printable, non-fraying, dimensionally stable, colourfast, and combinations thereof. According to a further aspect of the invention there is provided a mat manufactured by the method described herein.

By way of example, an embodiment of the invention will now be described with reference to the accompanying drawings, in which.

Figure 1:
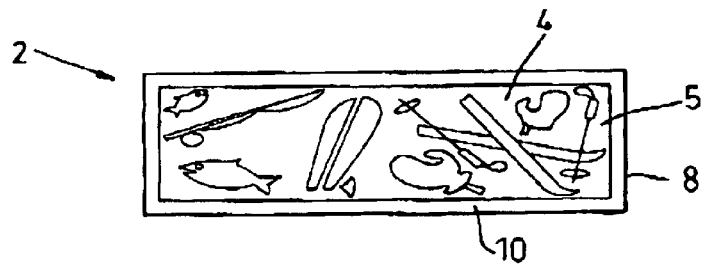
FIG. 1 is a plan view of a finished mat.
Figure 2:
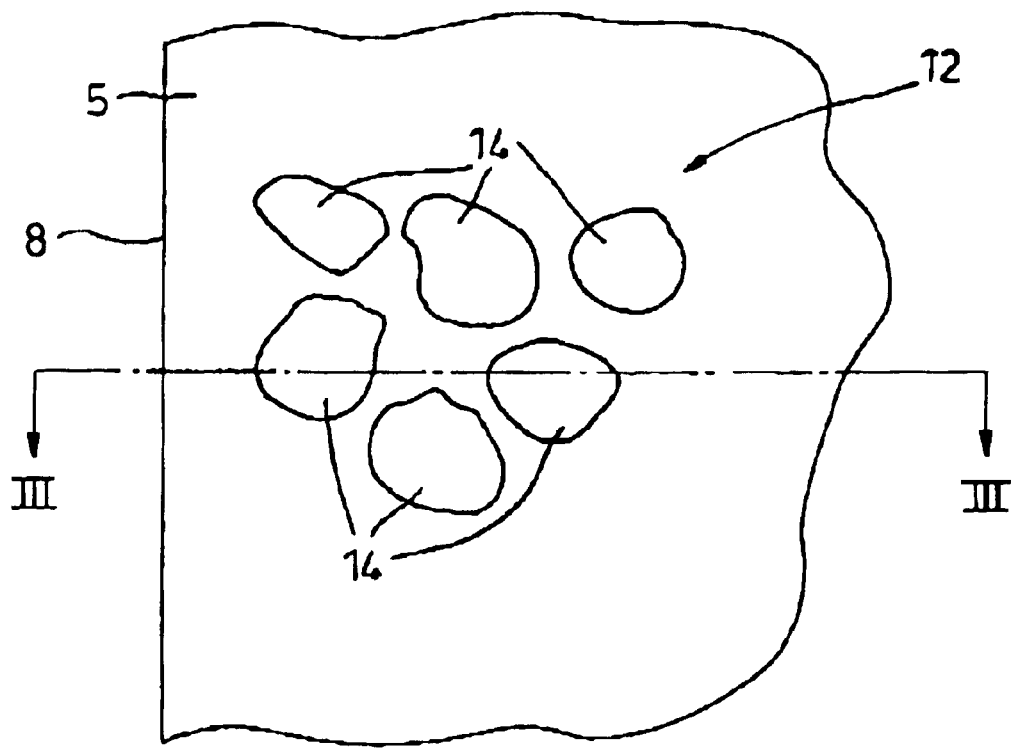
FIG. 2 is a plan view of portion a finished mat, at an enlarged scale showing the surface texture.
Figure 3:
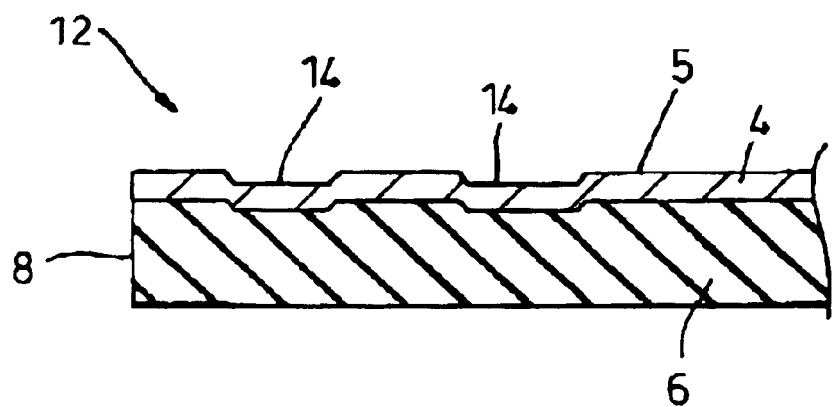
FIG. 3 is a partial cross-section through the mat, along line III—III.

The mat or pad 2 shown in FIGS. 1–3 has an absorbent fabric layer 4 that forms the upper face 5 of the mat, and a rubber backing layer 6. The fabric layer 4 is bonded to the rubber backing layer 6 through the application of heat and pressure. The fabric layer 4 and the rubber backing layer 6 both extend to the edge 8 of the mat 2, which is a cut edge. The fabric layer 4 is printed with a pattern or other matter, for example promotional matter. The dimensions of the mat are 90 cm long and 21 cm wide.

The rubber backing layer 6 is made from a natural or synthetic rubber, but is preferably a nitrile rubber compound. The rubber may be unfoamed or foamed. For a drip mat or table mat, the rubber backing layer 6 preferably has a thickness of approximately 0.5–3 mm. For a floor mat, the thickness is generally greater, for example 2–5 mm.

The fabric layer 4 is preferably made from microknitted polyester fabric such as that described in U.S. Pat. No.

5,916,273 or that sold by Milliken & Company under the trademark ENCORE. This fabric is made of 100% polyester fibre and is constructed as a microknit having, for example, a weight of 7.5±0.3 oz/yd$^2$, 66.0±2 courses and 34.0±2 wales. The fabric is sanded to break the surface, which provides a smooth upper face that is good for printing, for example by transfer printing.

We have discovered that this fabric does not fray, even after prolonged use of the mat and many washing cycles. The fabric does not have to be hemmed or the edges sealed in any other way, and the fabric layer 4 can therefore have a simple cut edge 8. This is a very important advantage, which greatly simplifies the manufacturing process as described more fully below. The fabric also has good dimensional stability, is light fast and has a dense construction, which prevents rubber seeping through the fabric during the vulcanisation process and provides a good printing surface. The microdenier fibres in the fabric provide a high surface area for good water holding capacity and wicking.

In accordance with the preferred embodiment, the fabric is treated as described in U.S. Pat. No. 5,935,484, the content of which is incorporated by reference herein.

Some examples of suitable fabric materials are given below.

|  | Example 1 | Example 2 | Example 3 |
| --- | --- | --- | --- |
| Construction | Microknit | Microknit | microknit |
| Width | 62.0" ± 1" | 64.0" ± 0.5" | 63.0" ± 1.0" |
| Weight (oz./sq. yd) | 7.50 ± 0.30 | 12.38 ± 0.30 | 5.25 ± 0.40 |
| Weight (oz./lin yd) | 13.10 ± 0.50 | 22.00 ± 0.50 | 7.80 ± 0.50 |
| Courses | 66.0 ± 2 | 60.0 ± 2 | 58.0 ± 2 |
| Wales | 34.0 ± 2 | 37.0 ± 2 | 40.0 ± 2 |
| Fibre blend | 100% polyester | 100% polyester | 100% polyester |

In accordance with one example, the fabric production process includes the following steps:

1. Texture the yarns. The texturing step can include chemically treating the yarns to provide a durable AESP and HMWEP coating.
2. Knit the fabric.
3. Sand the technical back of the fabric (which forms the exposed face of the fabric layer).
4. Dye or scour the fabric for bulking and to increase density, optically brighten the fabric, and chemically treat the fabric. This step usually takes about thirty minutes at 220° F. to 275° F., preferably 266° F. Chemically treating the fabric can be done during the texture step and/or during the dyeing step.
5. Dry and heat set the fabric at, for example, 330° F. to 400° F. In accordance with the preferred embodiment, the fabric is treated with an anionic-ethoxylated sulfonated polyester (AESP) and a high molecular weight ethoxylated polyester (HMWEP). These agents are applied together, in combination, during the yarn texturing stage and/or the dyeing stage of fabric production. Such agents are described in more detail in U.S. Pat. No. 5,935,484, the content of which is incorporated by reference herein. In particular, a HMWEP is described at column 3, lines 35–56 and an AESP is described at column 4, lines 10–15.

Preferably, the chemical treatment involves the application of 1.5% on weight of fabric (OWF) of the anionic ethoxylated sulfonated polyester together with 1.5% OWF high molecular weight ethoxylated polyester, each of which have about 16% solids and which together provide about 0.5% solids OWF. The AESP serves as an anionic stabilizer while the HMWEP serves as a lubricant/softener. The chemical agents are applied by exhaustion at about 150° F. to 275° F. The AESP and HMWEP can be mixed to provide about 1% to 8% OWF and about 0.1% to 1.0% solids OWF.

The chemical agents work with the anionic dyes and make the fabric super wicking and super absorbent.

The HMWEP and AESP are a dispersion up to about 140° F. and become less soluble at 160° F. and exhaust at 190 to 280° F. A high temperature application is required for durability by exhaustion at about 265° F. to 280° F., enhanced by heat setting of the fabric at about 330 to 375° F. It is believed that the mechanism of attachment is that the polyester fibres swell, the agents penetrate into the fibres and are anchored to the fibres.

One example of an AESP is Milease HPA by Hodgson Chemical, USA. One example of a HMWEP is Lubril QCX by Tennessee Eastman, USA.

In order to increase the water holding capacity of the fibre layer, the is thickness and/or weight of the fabric layer 4 may be increased, or a blend of fibres including absorbent fibres such as cotton may be used.

Although the mat does not have a physical border such as a rubber border, an "optical border" is provided by printing a margin 10 in black or a contrasting colour around the periphery of the fabric layer. This gives the mat an attractive appearance and it also serves a useful purpose in simplifying the manufacturing process, as described in more detail below.

Polyester fabric is naturally hydrophobic, which means that water tends to form beads on the surface of the fabric and is slow to be absorbed. To avoid this problem, the fabric is chemically treated with an anionic-ethoxylated sulfonated polyester and a high molecular weight ethoxylated polyester, to make it hydrophilic. We have found that this leads to much faster absorption of water and improved wicking of water through the fabric, with the result that surface of the fabric remains feeling dry to the touch even after a significant quantity of water has been absorbed.

We have further found that the treated fabric washes far more easily, allowing odours and even oily stains to be removed without difficulty.

One problem with existing rubber-backed drip mats is that the relatively thin fabric layer has a very limited water holding capacity and the mat can therefore quickly become soaked, leading to water running out of the mat, particularly when the mat is moved or lifted. To increase the holding capacity of the mat, the upper face 5 of the mat is provided with a surface texture 12, shown in FIGS. 2 and 3. We have found that this can greatly increase the water holding capacity of the mat, for example by as much as three times.

The surface texture 12 is preferably made by creating surface formations such as recessed dimples 14 in the upper face 5, each of those dimples having a height of 0.1–2.0 mm, preferably 0.2–0.5 mm, and a surface area of 0.2–100 mm$^2$, preferably 1.0–20 mm$^2$. The dimples are preferably randomly distributed and close packed, covering substantially the whole upper face 5 of the mat 2. Alternatively, other surface formations such as raised pimples, grooves, depressions, recesses or the like may be provided. It is evident that the surface formations provided in the fabric and the rubber layer of the finished bar mat enhance the liquid holding ability of the mat and may do so by increasing the surface area, serving as many reservoirs holding liquids, or other processes.

The rubber backed knitted polyester fabric material has been tested for moisture transport, wicking ability, water absorption, water retention and printability, in comparison to Terry towel material (yarn-dyed jacquard woven Terry cloth without a backing substrate) and a drip mat of a known type having a fabric layer of tufted cut pile polyester bonded to a 100% nitrile rubber backing layer. The knitted polyester fabric was treated with 1.5% AESP and 1.5% HMWEP and then laminated with a rubber backing and transfer printed. The fabric had a good appearance after transfer printing and was washed 20 times in industrial washes with no ravelling. The results of these tests are discussed below.

Moisture dissipation is a measure of how quickly water spilt on the surface of the material is absorbed. The test was conducted by placing a droplet of water on the surface of the material and timing how long it took to disappear. The results were as follows:

| Product | Moisture dissipation |
| --- | --- |
| Knitted polyester mat | 0 seconds |
| Tufted polyester mat | 10 seconds |
| Terry towel | >300 seconds |

This test shows that moisture is dissipated much more rapidly into the knitted polyester mat than either the tufted polyester mat or the Terry towel. Liquid absorbency is an indication of how much spilt water can be absorbed by the mat before it penetrates through or starts to run off the edges of the mat. This was tested by recording the dry weight of a 10×10 cm sample, placing the sample on a sheet of blotting paper and slowly dripping water onto the centre of the sample from a burette until water is seen either to soak through the sample or to run off the sample onto the blotting paper. The burette is then closed and the volume of water retained by the sample is recorded. The results were as follows:

| Product | Liquid absorbency |
| --- | --- |
| Knitted polyester mat | 19 ml |
| Tufted polyester mat | 14 ml |
| Terry towel | 2 ml |

The knitted polyester mat therefore absorbed considerably more water than either the tufted polyester mat or the Terry towel. The result for the Terry towel was very poor because the water soaked through the towel very quickly, before it was fully saturated.

Liquid retention is an indication of how much water is retained by the mat after it has been drained. This was tested by taking a saturated sample and hanging it vertically for 30 minutes, or until dripping had stopped. The sample is then weighed, and the difference from the dry weight indicates the amount of water retained. The results were as follows:

| Product | Liquid retention |
| --- | --- |
| Knitted polyester mat | 4 ml |
| Tufted polyester mat | 7 ml |
| Terry towel | 21 ml |

These tests show that the knitted polyester mat drains much more readily than either the tufted polyester mat or the Terry towel, therefore making it easier to dry the mat.

The results of a vertical wicking test are as follows:

| Product | Rate of rise in 30 minutes |
| --- | --- |
| Terry towel | 85 mm |
| Knitted polyester fabric (unbacked) | 212 mm |

These results demonstrate that the treated knitted polyester fabric absorbs about three times as much water as the Terry towel control.

A second water absorption test produced the following results:

| Product | Water absorption |
| --- | --- |
| Terry towel | 2 ml |
| Knitted polyester fabric (unbacked) | 7 ml |
| Knitted polyester mat (backed) with dimples or recesses | 18 ml |

In the third sample, the construction of the mat (having dimples or recesses) significantly increased the water absorption and/or holding capacity of the mat. It appears that the dimples or recesses increase the surface area and add small reservoirs for holding liquids.

Printability was assessed visually by examining the print appearance. The results were as follows:

| Product | Visual appearance |
| --- | --- |
| Knitted polyester mat | High resolution. Accurate print transfer. For example, 360 dpi transfer print paper = 360 dpi printed mat. |
| Tufted polyester mat | Very low resolution. Print resolution is limited to the tufting gauge. Transfer paper does not conform to the irregular surface of the tufted substrate. Only the pile tips are printed. As a result, white streaks are visible between tuft lines. |
| Terry towel | Not printed. Definition of artwork is limited to design capability of fabric formation equipment and yarn denier. |

The mat 2 may be designed for use as a drip mat or as a table covering or place mat. Alternatively, it may be designed for use as a floor mat such as a play mat or a mat intended for promotional or informational use in shops or other establishments, and may carry an advertisement or other printed matter. The mat may further be intended for use as a dust control mat at an entrance of a building, to remove dust and moisture from the shoes of pedestrians.

Figure 4:
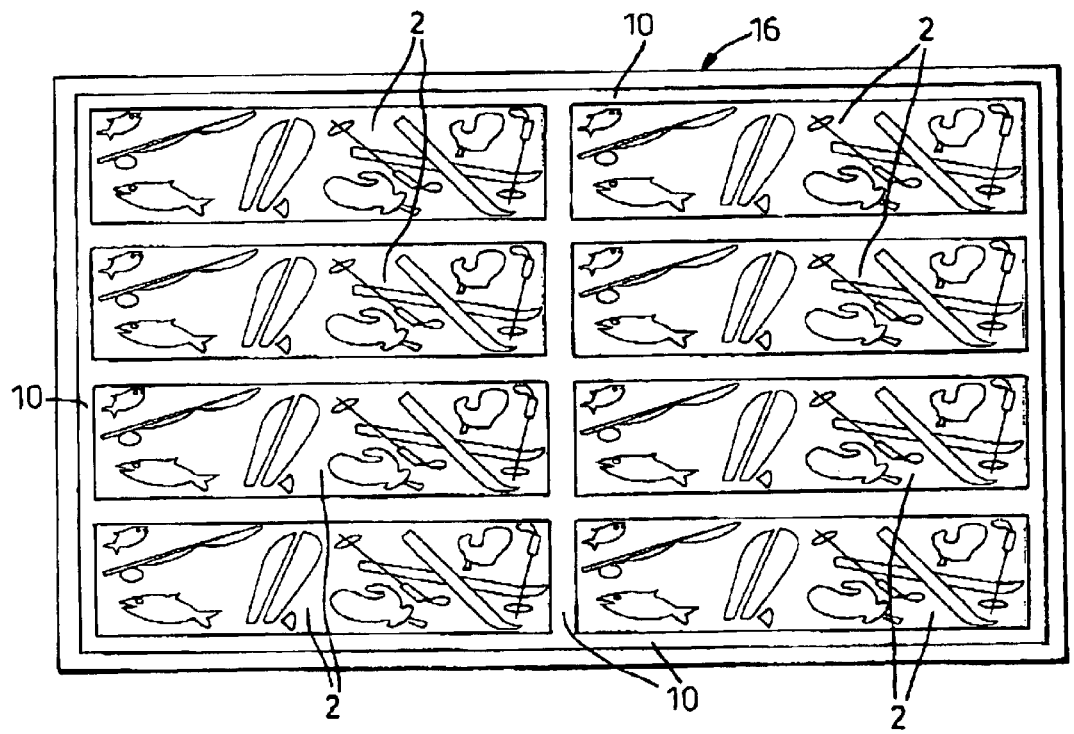
FIG. 4 is a plan view of a sheet of manufactured and printed rubber-backed fabric, prior to being cut into separate mats.

A process for manufacturing the mat will now be described with reference to FIGS. 4 and 5. As shown in FIG. 4, a large sheet 16 of rubber-backed fabric is made first, which is printed and subsequently cut up to make the individual mats 2. The margins 10 are printed onto the sheet 16 and the sheet is then cut along those margins. The margins 10 separate the printed images on the mats from one another, which simplifies the process of dividing the sheet. The sheet 16 may be cut up using a die cutter, a rotating cutter, a laser cutter or any other suitable cutter device.

Figure 5:
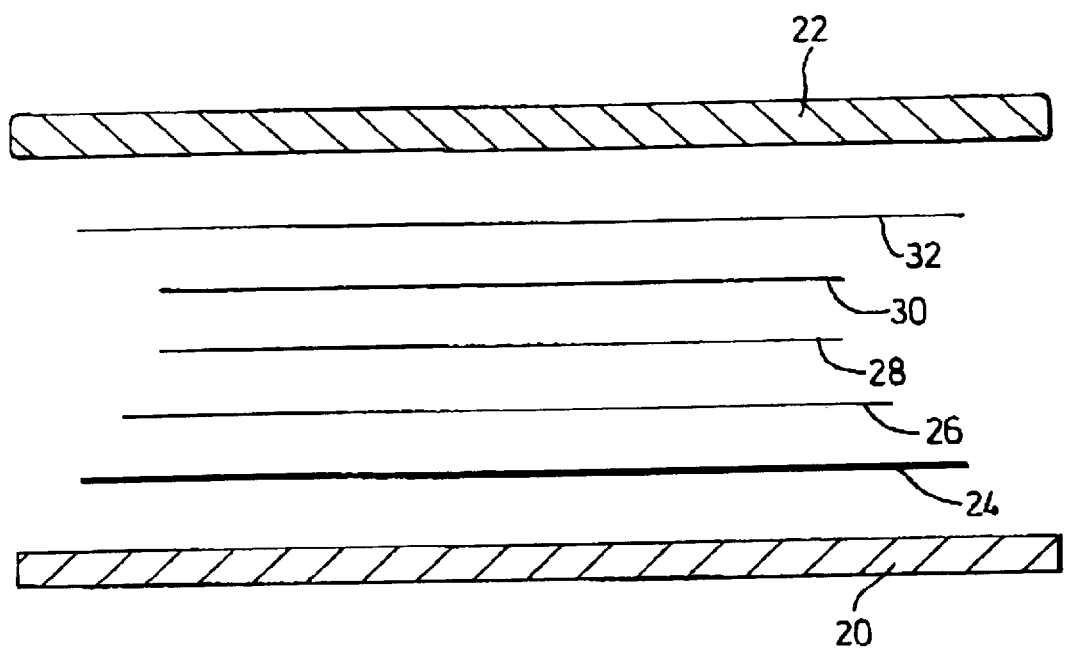
FIG. 5 is a schematic exploded cross-section showing the components of a rubber-backed sheet in a press during the manufacturing process.

FIG. 5 is a schematic exploded cross-section of the lay up in a press during manufacture. The press includes a heated metal platen 20, above which there is an inflatable diaphragm 22. The lay up consists of the following items placed in order on the heated platen 20: a texture sheet 24, a printed paper transfer sheet 26, a sheet of the knitted polyester fabric 28, a sheet of uncured rubber 30 and a top release sheet 32.

The fabric 28 is pre-treated with hydrophilic chemicals, for example by exhaustion, spraying, padding (emersion), foam coating, or the like. The sheet of fabric 28 is laid up next to the uncured rubber backing sheet 30. If the mat is to be printed during the backing process, the mat is laid up with the fabric side closer to the heated platen 20, to ensure good transfer of dyes from the transfer sheet 26 to the fabric 28. The sheet of knitted polyester fabric 28 and the sheet 30 of uncured rubber are each large enough to form several mats, as shown in FIG. 4.

The printed paper transfer sheet 26 holds the pattern that is to be transferred to the fabric 28, including the margin 10 that forms the "optical border" around each mat 2. It is laid up next to the fabric layer 4. The pattern is recorded on the transfer sheet 26 using sublimatic dyes, which are transferred to the fabric layer by the application of heat and pressure during the vulcanisation process. This process is described in more detail in our British patent application No. 9927067.0, the content of which is incorporated by reference herein.

The texture sheet 24 has a surface texture that is impressed into the fabric 28 and the upper face of the backing layer 30 during the vulcanisation process. This creates the surface texture 12 on the upper face 5 of the mat 2, as shown in FIGS. 2 and 3. The texture sheet 24 consists, for example, of an embossed metal plate or a sheet of PTFE-coated woven glass fabric.

The top release sheet 32 of PTFE-coated woven glass fabric covers the rubber backing sheet 30 to prevent it sticking to the diaphragm 22, and imparts a woven fabric imprint to the rear surface of that sheet.

The press is heated to a temperature of about 170° C. The diaphragm 22 is inflated, for example to a pressure of 30 pounds per square inch, pressing the mat against the heated platen 10, typically for a cycle time of 6 minutes.

The heat from the platen 20 softens and cures the rubber 30 and the pressure from the diaphragm 22 presses the sheet of fabric layer 28 into the rubber sheet 30, bonding the two sheets together. At the same time, the image is transferred from the transfer sheet 26 to the fabric sheet 28, and the texture sheet 24 impresses the surface texture 12 into the upper face 5 of the mat. The rubber backed sheet 16 is then removed from the press and allowed to cool, after which it is cut up to create the individual mats, for example using a die cutter.

In some types of press (not shown), the positions of the metal platen and the diaphragm are reversed, the heated metal platen being located above the inflatable diaphragm. In that case, the mat is laid up in the opposite order, with the fabric above the backing sheet and the transfer sheet on the platen side of the fabric, and the cycle time is increased to approximately 20 minutes. The process for making the mat is otherwise substantially as described above. The manufacturing process may be modified in various different ways, some of which will now be described.

Instead of printing the large rubber-backed sheet 16 during the vulcanisation process and subsequently cutting that sheet into separate mats, the sheet may be printed after vulcanisation, either before or after cutting. If large mats are required, for example floor mats, these may be laid up and made individually, without a subsequent cutting process.

A continuous manufacturing process may be implemented by feeding sheets of treated fabric and uncured rubber through sets of heated rollers, for the vulcanisation and pressing operation. The rubber-backed sheet so formed can then be cut up and printed to make the individual mats.

Alternatively, the rubber-backed sheet can be made by applying foam rubber directly to the back of the treated fabric, for example by spraying or coating and using a doctor blade to control the thickness of the backing. An anti-bacterial, anti-microbial and/or anti-pathogenic agent may be added to the fabric and/or the rubber layer. For example, an anti-bacterial agent may be added during the chemical treatment of the yarn and/or knitted fabric.

We have found that drip mats according to the present invention as described herein have a number of significant advantages over existing drip mats, including the following:

1. The mat has very good moisture absorbency and provides for rapid wicking of moisture through the fabric. Thus, when a wet glass is placed on the mat, moisture is very quickly removed from the bottom of the glass. This moisture is then dispersed rapidly through the fabric, leaving the mat feeling dry to the touch.
2. The mat has good launderability. We have found that it can withstand between twenty and fifty industrial washing cycles without significant deterioration. The mat is also colour-fast and does not fade significantly during washing.
3. The fabric layer is capable of supporting fine detailed printing, allowing it to carry a high resolution picture. Pattern resolution has been found to be 5–10 times higher than that of conventional rubber-backed drip mats.
4. The mat is impervious to liquid, preventing moisture from running or seeping through the mat onto the surface of the bar.
5. The fabric layer is naturally non-fraying. The cut edge does not therefore need to be treated to prevent fraying, for example by sewing, surging, ultrasonic welding or laser cutting.
6. The mat is dimensionally stable and does not wrinkle or curl during laundering. It therefore always lies flat.
7. The mat is hygienic and meets proposed European legislation banning the use of traditional Terry towelling bar mats.

The fabric layer is preferably 100% polyester, but may alternatively be a polyester/cotton blend, nylon, corn fibre or other fibres that are conducive to printing and are naturally hydrophilic or can be treated to render them hydrophilic. The fabric material is preferably a microdenier knitted fabric but it may alternatively be an ordinary knitted fabric or a woven, tufted or non-woven fabric.

The hydrophilic agents may be applied by spraying, foam coating, dye jetting, padding, applying during yarn formation or included in the yarn formation. The fabric may also include a blend of hydrophilic and hydrophobic yarns. The mat or pad may be printed by various methods including heat transfer, digital printing (including ink-jet and electrostatic printing), screen printing or other methods, or the mat or pad may simply be dyed. The fabric may also include a dyed background colour and then be transfer printed over the background colour. Although it is preferred that the rubber backing layer 6 is made from natural or synthetic rubber, it is contemplated that other liquid impervious or impermeable materials could be used such as olefins, urethanes, acrylics, latexes, plastics, PVC, or the like. Also, it should be understood that water resistant or waterproof fabrics may also be used as the backing layer which would prevent the passage of liquid from the upper fabric layer to a support surface such as a bar, counter-top, desktop, or the like. Further, it is contemplated that the liquid impervious backing or layer may be attached, adhered, glued, stitched, bonded, sprayed, coated, welded, tacked, melted, needled, laser cut, and/or the like to the upper fabric layer. The materials selected for the upper fabric layer and the lower liquid impervious layer depend on the particular end use of the mat, pad, blotter, composite, article, or the like.

Also, in accordance with one embodiment of the present invention, the mat, pad, blotter, or the like is a disposable item which is not subjected to numerous industrial washings or launderings. In this embodiment, the backing or lower water impervious layer can be much thinner than that of a drip mat or pad that is subjected to numerous washing cycles.

In accordance with another embodiment of the present invention, the liquid impervious backing or lower layer is textured on its upper surface so that when the fabric layer is applied, adhered, glued, attached, or the like thereto, there are provided numerous small reservoirs, recesses, pockets, or the like for receiving and retaining liquids or moisture that passed through the upper fabric layer.

In accordance with another embodiment, a first rubber layer having openings therethrough is placed over a second lower solid rubber layer to produce the small recesses, pockets, or the like to hold or retain liquids.

Still further, although it is preferred to have a mat, pad, blotter, or the like which is formed of an upper fabric layer and a lower liquid impervious backing or layer, it is to be understood that a third absorbent layer may be added between the upper fabric and lower liquid impervious layers. For example, one may add a cotton fabric layer between the upper fabric layer and lower rubber backing or layer. This intermediate, or middle, layer serves to absorb additional liquid and/or moisture and increase the liquid or moisture holding capacity of the pad, mat, blotter, or the like. By way of another example, an absorbent intermediate layer may be formed of cotton batting or an inner liner, a cotton and polyester blend fabric, a cotton and rayon blend fabric, nylon, corn fibres, stacked fibres, spun fibres, and/or the like.

The intermediate or third middle layer may be bonded or fused to the fabric to form a two-layer composite, for example by use of an inner liner fuse material, adhesives, glue, needle punching, or the like.

To make clean edges around the mat, pad, article or the like, it is contemplated to use pinking, laser cutting, hot knives, sewing, stitching, over-coating with rubber, or the like. In accordance with one example, holes are punched through the fabric or fabric composite near the edge, rubber strips are placed over the edges (like a frame), then the rubber backing layer and strips are joined by vulcanisation. This traps the fabric within a rubber frame. Although it is preferred to use through holes to help retain the fabric during laundering, it is to be understood that with, for example, a porous fabric such holes may be eliminated.

Although the mat shown in the drawings is substantially rectangular, it is to be understood that it may be any shape. For example, it may be a square, triangle or any other polygon, it may have rounded corners, or it may be circular or any other curved shape.

The fabric may be woven, un-woven, flat woven, flocked, felt, pile fabric, brushed flat woven, needled on one side flat woven, or the like. Preferably, the fabric is printable on at least one side.

Although it is preferred that the rubber backing be bonded to substantially the entire lower surface of the fabric layer, it is contemplated that the fabric layer and the liquid impervious backing or lower layer may be joined together, attached, adhered, stitched, or the like by bonding, gluing, welding, tacking, stitching, melting, and the like in selected areas, around the edge, in selected locations, or the like.

The lower impervious surface may be coated, extruded, knife coated, laminated, calendered, spray coated, foam coated, bonded, vulcanised, or the like.

In accordance with one embodiment of the invention, a non-woven polyester fabric has a thin polyolefin layer extruded on the lower surface thereof. It is not essential that the mat, pad or the like has separate fabric and backing layers. Instead, the mat, pad, or the like may consist of a single layer of material having an absorbent, hydrophilic upper surface and a lower surface that is substantially impervious to liquid.

The lower surface may be made substantially impervious to liquid in various different ways, including the following: by chemically treating the fabric back to render it impermeable; by calendering the fabric back to render it impermeable; by the application of heat and/or pressure to render the fabric back impermeable, for example using a polypropylene low melt ground yarn; by laminate backing; by extrusion coat backing; by bonding, tacking, gluing, needling, laser cutting, melting or welding, ultrasonic welding or otherwise attaching an impermeable backing to the fabric layer.

More specifically, we have made the following articles:
On 40 thou (1 mm thick) rubber:
Place mats for dining tables
Coasters
Printed direction indicators for use in exhibition halls, in the form of A4 size arrows
Printed direction indicators, in the form of printed footprints
Stair risers, carrying printed messages/advertisements, which are fixed to the risers of staircases.
On 60 thou (1.5 mm thick) rubber:
Poster mats, advertising floor mats
On 120 thou (3 mm thick) rubber:
Carpet tiles, carrying printed advertisements, for use in carpet tiled areas.
Taxi mats, carrying printed advertisements, for use in the passenger area of taxi cabs.

End uses of the material described herein include but are not limited to the following:
1. Drip mats
2. Bar mats
3. Floor mats
4. Logo mats
5. Personalised mats
6. Koozies/cozies—printed coverings for a bottle/glass/or other container to keep contents warm and/or cold
7. Coasters
8. Bath mats
9. Outdoor furniture
10. Insoles for shoes
11. Picnic/beach blankets
12. Car mats/custom fittings for the back of SUVs
13. Sunglass cases
14. Gloves—interior
15. Computer cases
16. Protective coverings for sensitive equipment
17. Mits for car washing or the end of an ice scraper
18. Seat covers 19. Wine bottle covers
20. Bags—handbags, beachbags
21. Inserts for nursing bras
22. Athletic wear
23. Advertising beach towels
24. Sun/lounge chairs for pool or beach side
25. Socks
26. Athletic shoes
27. Sleep mats for children
28. Mouse pads
29. Place mats
30. Bath robes
31. Robes for pool side
32. Robes for athletic teams—swim teams, etc—to advertise sponsors or the team
33. Mattress covers
34. Inserts for hats/caps (the band that touches the forehead)
35. Coat liners
36. Earphones—the part that touches the ear
37. Athletic sweat bands
38. Splints or other supports (medical)
39. Ankle or other wraps for support (to wick moisture from skin)
40. Back braces
41. Rugs FIG. 4 shows 8 bar mats with optical borders printed onto a sheet of woven polyester fabric bonded to rubber.

FIG. 1 shows a finished mat die cut from the sheet of FIG. 4 with dimensions of 90×21 cms.

FIG. 5 shows an exploded view of lay up during manufacture.

1. Inflatable diaphragm.
2. Release sheet—woven glass fabric coated in PTFE.
3. Rubber sheet.
4. Polyester fabric.
5. Printed paper transfer.
6. Embossed plate to impart surface finish.
7. Heated platen.

The heated platen and inflatable diaphragm can be reversed depending on the type of vulcanising press. If the reverse type of machine is used, the whole lay up assembly also has to be reversed as the transfer paper has to be closest to the heat.

What is claimed is:

1. A fluid absorbent mat having a single fabric layer defining the upper exterior of the mat and a rubber backing bonded to the single the fabric layer, wherein the single fabric layer consists essentially of a knitted polyester fabric having a textured surface that includes raised and/or recessed surface formations and wherein the single fabric layer is adapted to retain fluid therein, wherein the surface formations define a plurality of raised portions and depressed portions disposed in cooperating relation across the mat such that fluid may be collected at said depressed portions, and wherein the average difference in height between the raised portions and the depressed portions is about 0.1–2.0 mm.

2. The mat according to claim 1, wherein the fabric layer is knitted polyester fabric including microdenier yarns comprising filaments less than 1.1 denier.

3. The mat according to claim 1, wherein the knitted polyester fabric is a warp-knitted plush polyester fabric.

4. The mat according to claim 1, wherein the fabric includes a pile yarn and a ground yarn.

5. The mat according to claim 4, wherein the pile yarn is a micro-denier yarn comprising filaments of less than or equal to 1.1 denier.

6. The mat according to claim 4, wherein the ground yarn is a monofilament of no less than 10 denier.

7. The mat according to claim 1, wherein the single fabric layer has an upper surface, wherein said upper surface is a sanded surface.

8. The mat according to claim 1, wherein the fabric is chemically treated to render it hydrophilic.

9. The mat according to claim 8, wherein the fabric is chemically treated with an anionic-ethoxylated sulfonated polyester and a high molecular weight ethoxylated polyester.

10. The mat according to claim 1, wherein the rubber backing has a thickness of 0.5–5 mm.

11. The mat according to claim 1, wherein said mat is at least one of a drip mat, poster mat, floor mat, place mat, coaster, stair riser, carpet tile, and taxi mat.

12. The mat according to claim 1, wherein the mat is an advertising floor mat.

13. A fluid absorbent mat having a single fabric layer defining the upper exterior of the mat and a rubber backing bonded to the single the fabric layer, wherein the single fabric layer consists essentially of a knitted polyester fabric having a textured surface that includes raised and/or recessed surface formations and wherein the single fabric layer is adapted to retain fluid therein, wherein the individual surface formations have an average surface area of 0.2–100 mm$^2$.

14. The mat according to claim 13, wherein the fabric layer is knitted polyester fabric including microdenier yarns comprising filaments less than 1.1 denier.

15. The mat according to claim 13, wherein the knitted polyester fabric is a warp-knitted plush polyester fabric.

16. The mat according to claim 13, wherein the fabric includes a pile yarn and a ground yarn.

17. The mat according to claim 16, wherein the pile yarn is a micro-denier yarn comprising filaments of less than or equal to 1.1 denier.

18. The mat according to claim 16, wherein the ground yarn is a monofilament of no less than 10 denier.

19. The mat according to claim 13, wherein the single fabric layer has an upper surface, wherein said upper surface is a sanded surface.

20. The mat according to claim 13, wherein the fabric is chemically treated to render it hydrophilic.

21. The mat according to claim 20, wherein the fabric is chemically treated with an anionic-ethoxylated sulfonated polyester and a high molecular weight ethoxylated polyester.

22. The mat according to claim 13, wherein the rubber backing has a thickness of 0.5–5 mm.

23. The mat according to claim 13, wherein said mat is at least one of a drip mat, poster mat, floor mat, place mat, coaster, stair riser, carpet tile, and taxi mat.

24. The mat according to claim 13, wherein the mat is an advertising floor mat.

25. A fluid absorbent mat having a single fabric layer defining the upper exterior of the mat and a rubber backing bonded to the simile the fabric layer, wherein the single fabric layer consists essentially of a knitted polyester fabric having a textured surface that includes raised and/or recessed surface formations and wherein the simile fabric layer is adapted to retain fluid therein, wherein the surface formations are formed by underlying raised and/or recessed surfaces on the face of the rubber backing that is bonded to the single fabric layer.

26. The mat according to claim 25, wherein the fabric layer is knitted polyester fabric including microdenier yarns comprising filaments less than 1.1 denier.

27. The mat according to claim 25, wherein the knitted polyester fabric is a warp-knitted plush polyester fabric.

28. The mat according to claim 25, wherein the fabric includes a pile yarn and a ground yarn.

29. The mat according to claim 28, wherein the pile yarn is a micro-denier yarn comprising filaments of less than or equal to 1.1 denier.

30. The mat according to claim 28, wherein the ground yarn is a monofilament of no less than 10 denier.

31. The mat according to claim 25, wherein the single fabric layer has an upper surface, wherein said upper surface is a sanded surface.

32. The mat according to claim 25, wherein the fabric is chemically treated to render it hydrophilic.

33. The mat according to claim 32, wherein the fabric is chemically treated with an anionic-ethoxylated sulfonated polyester and a high molecular weight ethoxylated polyester.

34. The mat according to claim 25, wherein the rubber backing has a thickness of 0.5–5 mm.

35. The mat according to claim 25, wherein said mat is at least one of a drip mat, poster mat, floor mat, place met, coaster, stair riser, carpet tile, and taxi mat.

36. The mat according to claim 25, wherein the mat is an advertising floor mat.

* * * * *

UNITED STATES PATENT AND TRADEMARK OFFICE
CERTIFICATE OF CORRECTION

PATENT NO.   : 6,774,067 B2
DATED        : August 10, 2004
INVENTOR(S)  : Roy P. Demott et al.

It is certified that error appears in the above-identified patent and that said Letters Patent is hereby corrected as shown below:

<u>Column 14,</u>
Line 60, delete the words "simile the" and insert the word -- single --.
Line 63, delete the word "simile" and insert the word -- single --.

Signed and Sealed this

Seventh Day of December, 2004

JON W. DUDAS
*Director of the United States Patent and Trademark Office*